United States Patent [19]

Tabor

[11] 4,223,711

[45] Sep. 23, 1980

[54] SELF-LOCKING FASTENER

[75] Inventor: Joseph A. Tabor, Mentor, Ohio

[73] Assignee: Russell, Burdsall & Ward Corporation, Mentor, Ohio

[21] Appl. No.: 921,716

[22] Filed: Jul. 3, 1978

[51] Int. Cl.² .......................................... F16B 39/282
[52] U.S. Cl. ...................................................... 151/37
[58] Field of Search ............................ 151/37, 35, 34

[56] References Cited

U.S. PATENT DOCUMENTS

| | | | |
|---|---|---|---|
| 2,959,204 | 11/1960 | Rigot | 151/37 |
| 3,389,734 | 6/1968 | Gutshall | 151/37 |
| 3,605,845 | 9/1971 | Junker | 151/37 |
| 3,752,203 | 8/1973 | Hill | 151/37 |
| 3,972,360 | 8/1976 | Cadwallader | 151/37 X |

FOREIGN PATENT DOCUMENTS 2610747 9/1977 Fed. Rep. of Germany ............ 151/37
1444075 7/1976 United Kingdom ...................... 151/37

Primary Examiner—Ramon S. Britts
Attorney, Agent, or Firm—Pearne, Gordon, Sessions

[57] ABSTRACT

A self-locking fastener is disclosed having a load surface adapted to be tightened against a flat mating surface providing self-locking means which include an inner bearing surface having an outer extremity located in a bearing plane and inclined inwardly and back from such plane, radially extending teeth extending outwardly from the inner bearing surface and a skirt at the outer extremity of the teeth. The skirt provides an axial extremity located in the bearing plane and inclined inner and outer walls extending back therefrom. The teeth define recesses into which material from the mating part is displaced to provide the locking of the fastener. The inner bearing surfaces and the skirt cooperate to support the ends of the teeth and to provide a full seal at each extremity thereof.

7 Claims, 5 Drawing Figures

SELF-LOCKING FASTENER

BACKGROUND OF INVENTION

This invention relates generally to self locking fasteners and, more particularly, to a fastener having a novel and improved locking load surface which embeds into a mating part and provides means to lock against accidental loosening of the fastener.

PRIOR ART

Self locking fasteners having saw tooth type teeth which embed into a mating surface to prevent accidental loosening are well known. Examples of such fasteners are described in the U.S. Pat. Nos. 1,009,801, 1,298,863, 2,959,204, 3,078,899, 3,255,797, 3,373,631, 3,389,734, and 3,605,845.

The Rigot Pat. No. 2,959,204, assigned to the assignee of the present invention, provides a radial bearing surface and peripheral teeth which extend pass the plane of the bearing surface. In such devices, the bearing surface tends to limit the penetration of the teeth to a maximum depth substantially equal to the distance the teeth project beyond such planes.

The Gutshall Pat. No. 3,389,734 describes a self locking screw in which an annulus of inclined teeth extend radially inward from a relatively narrow axially extending flange. When such fastener is tightened against the mating part, the teeth and flange embed into the mating surface. The Gutschall device does not provide any load bearing surface substantially normal to the axis of the screw.

The Junker Pat. No. 3,605,845 discloses several embodiments of self-locking fasteners. In such embodiment, teeth which are inclined or radial extend from the shank or threads of the fastener to an outer load bearing surface having substantial radial width. In the illustrated embodiments, the bearing surfaces are inclined back from the bearing plane. Such structure provides teeth of excessive length, the inner extremities of which tend to have insufficient radius to provide significant locking functions. Further, the relatively large area of the bearing surface tends to limit the penetration of the teeth required for good locking.

SUMMARY OF INVENTION

In accordance with the present invention, a novel and improved locking and load bearing structure is provided in which the teeth have edges extending radially along a bearing plane perpendicular to the axis of the fastener. The teeth are bounded at the outer extremity by relatively narrow axially extending skirt having an axial extremity in such bearing plane. A bearing surface extends inwardly from the teeth and also provides an axial extremity in the bearing plane.

When a fastener incorporating this invention is tightened against a mating part, the extremity of the outer flange, the edges of the teeth and the bearing surface initially engage the mating surface. As the fastener is tightened, the surfaces progressively penetrate into the mating surface causing material of the mating surface to be displaced into the recesses between the teeth. As tightening progresses, the area of engagement of the bearing surface rapidly increases to prevent excessive penetration of the locking system into the mating surface. With this structure, excessive forces are not required to obtain proper penetration since the effected area of the bearing surface is relatively small initially, and increases as the penetration progresses. The outer flange functions to provide a peripheral seal around the locking projections to prevent moisture or other contaminants from penetrating under the head into the zone at the locking projections where any surface finish on the mating part is distroyed. Further, because the outer flange is circular, it does not cause any chipping of the protective coating which might exist beyond the engaged area. Still further, the flange provides support for the outer ends of the saw tooth projections. Similarly, the inner bearing surface provides a seal with the mating part within the zone engaged by the locking projections and provides support for such locking projections.

In the preferred embodiment, the inner wall and outer ends of the recesses are inclined to eliminate sharp corners at the ends of the recess forming projections on the tooling. Consequently, good tool life is obtained with the tools required to form the screws in accordance with this invention.

DETAILED DESCRIPTION OF THE DRAWINGS

The present invention is illustrated as applied to a flange screw. However, in its broader aspects, this invention can be also applied to other types of screws, bolts and nuts. Therefore, when the term "threaded fastener" is used herein, it is intended that it encompass the various types of threaded fasteners to which this invention can be applied and is not intended to be limited to flange screws per se.

Figure 1:
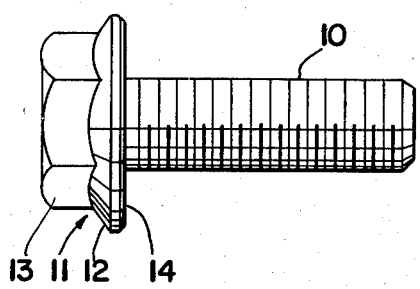
FIG. 1 is a side elevation of a flange screw in accordance with this invention.

Referring to the drawings, FIG. 1 illustrates a flanged screw incorporating the present invention. Such screw includes a threaded shank 10 and a head 11 providing a flange 12 and a hexagonal wrenching portion 13. The load faces 14 on the underside of the flange 12 is adapted to engage a mating part when the screw is threaded into place and is provided with a locking system to prevent accidental loosening of the screw.

Figure 2:
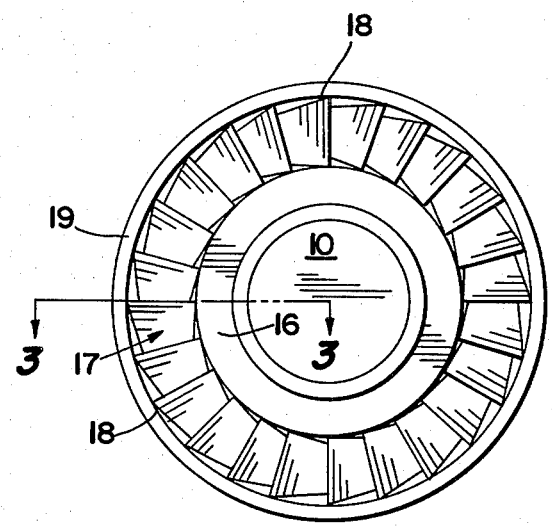
FIG. 2 is an end view of the screw illustrated in FIG. 1 illustrating the locking system provided on the underside head of the screw.
Figure 2B:
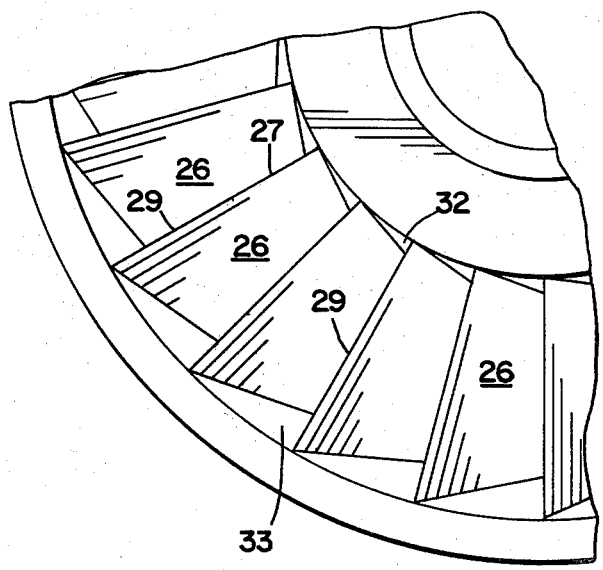
FIG. 2b is an enlarged fragmentary view similar to FIG. 2 illustrating the details of the structure of the locking system at greater scale.

Referring to FIG. 2, the locking system includes an annular bearing surface 16 which extends from the shank 10 to an annulus of locking surfaces 17 consisting of a plurality of circumferentially arranged radially extending saw tooth shaped projections 18. Positioned around the locking surfaces 17 is an axially extending skirt 19.

Referring now to FIGS. 2b through 4, the bearing surface 16 extends radially out from the shank 10 from an inner extremity at 21 to an outer extremity at 22 where it joins with the inner ends of the saw tooth shaped projections 18. The outer extremity 22 of the bearing surface 16 constitutes an annular edge extending around the threaded shank 10 concentric with the central axis 23 of the fastener and located in a bearing plane 24 which is perpendicular to the axis 23. The bearing surface is preferably inclined back from the bearing plane 24 as it extends inwardly from the outer extremity for reasons more fully described below.

The projections 18 each include a ramp surface 26 which extends from an edge 27 to an intersection 28 with a locking surface 29 of an adjacent tooth projection. The locking surfaces 29 extend from the edge 27 to the associated intersection 28 and extend along radial planes containing the axis 23. The ramp surfaces 26 on the other hand, extend in a peripheral inclined manner back from the edge line 27 contained in the plane 24 so that the ramp surface of each projection 18 in cooperation with the locking surface 29 of the next adjacent projection cooperate to define a recess 31 extending radially of the fastener from an inner wall 32 to an outer wall 33. Preferably, the inner wall 32 is a portion of a cone and is included radially outward as it extends back from the plane 24 by an angle D. Similarly, the walls 33 are also portions of a cone which extend radially inward as they extend back from a plane 24 and form with the plane 24 an angle C.

The skirt 19 is formed partially by the inclined walls 33 and an outwardly extending opposed inclined wall 34 which intersect at 36 in the plane 24. The line of intersection 36 preferably extends along the plane 24 as does the circular line established by the outer extremity 22 bearing surface and the edges 27 of the projections.

Figure 3:
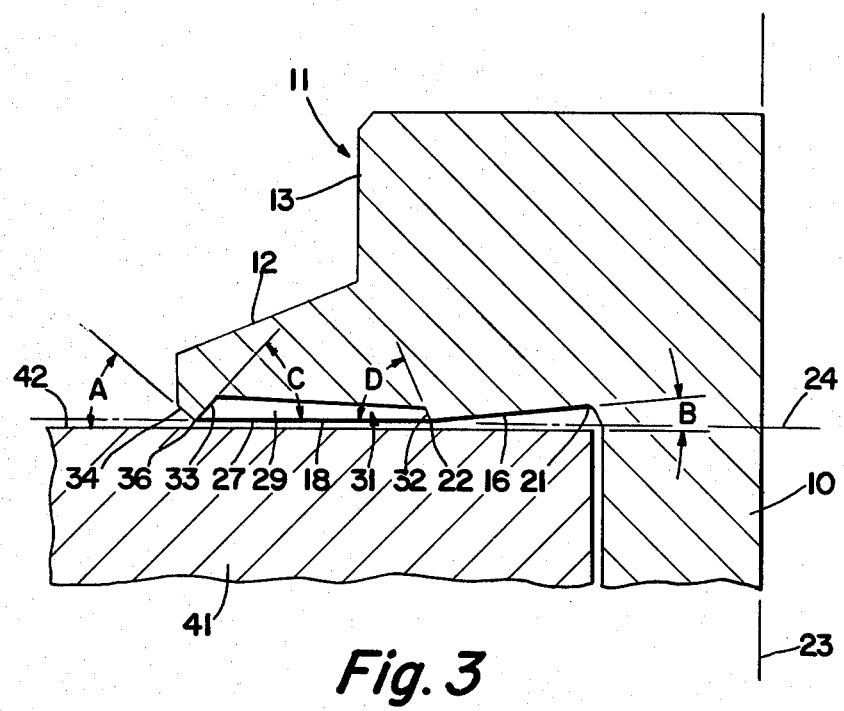
FIG. 3 is a enlarged centerline section taken generally along 3—3 of FIG. 2; and, FIG. 4 is an enlarged fragmentary perspective view illustrating a portion of the locking system.
Figure 4:
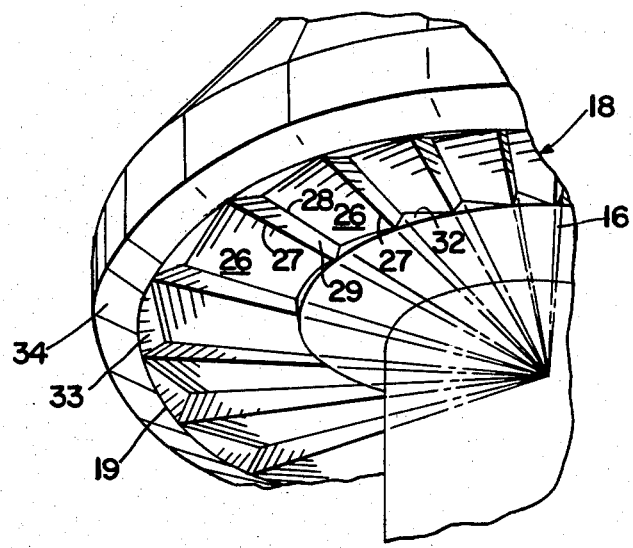

When a fastener is installed against a mating part schematically represented at 41 in FIG. 3 having a surface 42 perpendicular to the axis 23 of the fastener, the surface 42 is engaged substantially simultaneously by two concentric lines formed by the intersection 36, the outer extremity 22 of the bearing surface and by each of the edges 27 of the projections 18. As the fastener is tightened in against the surface 42 the pressure developed along the lines of engagement reaches values sufficiently high to cause the locking surface to commence to penetrate into the surface 42 and cause displacement of the material of the mating part 41. Such penetration can cause either cold flow, bending or other forms of displacement of the material of the mating part. As the penetration continues, the portions of the ramp surfaces 26 adjacent to the edges 27 progressively contact the material of the mating part along with the portions of the bearing surface 16 adjacent to the outer extremity 22. Similarly, the material of the mating part engages portions of the surfaces 33 and the surface 34. Because the ramp surfaces are inclined with respect to the tightening rotation, they function as camming surfaces to allow continued tightening rotation of the fastener without excessive buildup in resistance to such continued rotation.

Continued penetration rapidly increases the effective area of the bearing surface and along with the additional engagement of the ramp surfaces 26 with the material of the mating part limits, the degree of penetration of the locking system into the mating part.

In order to insure that the proper amount of penetration occurs to provide the self locking function described below, it is important that excessive bearing surface areas to not come into play to excessively limit the penetration. For this reason, the skirt 19 is formed with a relatively sharp edge and the tooth surfaces 33 and 34 extend back from the bearing plane 24 at angles A and C which are substantially large angles. On the other hand, the bearing surface 16 preferably extends back from the plane 24 by a relatively small angle. In the illustrated embodiment, the angle A is preferably no less than about 30 degrees, the angle B is preferably at least 8 degrees. The angle C is preferably a maximum of about 45 degrees and the angle D is preferably about 75 degrees. Since the angles A and C have relatively large values, the outer flange 19 does not provide any substantial area of bearing surface as the penetration of the locking surfaces continues. However, the relatively small angle B ensures that sufficient areas provided along the bearing surface to limit the penetration and prevent excessive penetrations during the tightening of the fastener.

It has been found in actual practice if excessive bearing surface is provided, insufficient penetration tends to occur. For this reason, the location of the bearing surface 16 inward from the locking projections 18 where the radius is relatively small and correspondingly, the area of engagement is not excessive provides improved results for controlled penetration. Further, the use of a relatively sharp skirt 19 adjacent to the periphery where the radius is large, insures that excessive bearing areas do not develop to prevent adequate penetration of the locking projections. The outer flange, however, penetrates into the surface 42 as the fastener is tightened and provides a full seal therewith to prevent the entry of contaminants or moisture which can cause corrosion. Similarly, the bearing surface 16 provides an inner seal which prevents any possibility of moisture penetration from inner side of the locking engagement. It should be understood that the engagement of the locking projections with the surface 42 and the penetration of the projections into such surface destroys any protective coatings which might have been applied to the mating surface 42 and would provide bare material which could cause excessive corrosion if moisture could penetrate into the zone. Also because the skirt surface 34 is conical, there is no tendency for chipping to occur beyond the area of engagement. A similar situation exists with respect to the bearing surface 16 because the area of engagement with the mating part is also conical.

With the illustrated structure, the teeth are supported at both ends and therefor have substantial strength. Also, the inclination of the two surfaces 32 and 33 eliminates the need for sharp corners on the tooling used to form the parts, and improves the tool life.

As the fastener is tightened causing penetration of the locking system into the surface 42, material is displaced into the recesses between the teeth and functions to mechanically interfer with the locking surfaces 29 to prevent unintentional loosening of the fastener. With the present invention, the initial torque to loosen the fastener is higher than the tightening torque and can have a breakaway loosening torque in the order of 1½ times the tightening torque involved. Further, a given fastener in accordance with the present invention can be used with mating parts of substantially different hardnesses and can be tightened to substantially different clamping forces while still providing proper self locking characteristics.

Although a preferred embodiment of this invention is illustrated, it should be understood that various modifications are rearrangements of parts may be resorted to without departing from the scope of the invention disclosed and claimed herein.

What is claimed is:

1. A self-locking fastener comprising thread means around a central axis, a load surface, and wrenching means permitting said fastener to be tightened and loosened, said load surface being adapted to be tightened against a substantially flat mating surface and providing self-locking means including:

(a) an annular bearing surface concentric with said thread means having an outer edge located in a bearing plane perpendicular to said central axis and extending back from said plane as it extends radially inward from said edge;

(b) a plurality of circumferentially disposed radially extending teeth extending substantially radially from said edge of said bearing surface, said teeth providing edges lying along said plane, inclined ramp surfaces and axially extending locking surfaces which extend to an inner axially extending end surface and cooperate therewith to define recesses between said teeth extending back from said bearing plane along the entire length of said teeth;

(c) an annular axially extending skirt around said teeth at the outer extremities thereof, said skirt having an axial edge in said bearing plane and providing opposed inner and outer axially extending walls which substantially intersect at said axial edge;

(d) tightening of said fastener against a mating surface causing said edge of said bearing surface, said edges of said teeth and said axial edge of said skirt to engage said mating surface substantially simultaneously and to be pressed into said mating surface and causing the material forming said mating surface to be displaced past said bearing plane into said recesses adjacent to said locking surfaces so that a mechanical interference is established between said locking surfaces and the material of said mating surface displaced past said bearing plane to resist loosening of said fastener, said ramp surfaces engaging the material displaced past said bearing plane while said fastener is being tightened and operating to provide a camming action allowing continued tightening of said fastener without encountering excessive torque; and (e) said skirt and said bearing surface providing support for the ends of said teeth and also cooperating to form a continuous seal along both extremities of said teeth.

2. A self-locking fastener as set forth in claim 1 wherein said bearing plane and said bearing surface form an angle of at least about 8 degrees.

3. A self-locking fastener set forth in claim 2 wherein the outer wall of said skirt is inclined and forms an angle with respect to said bearing plane of at least 30 degrees.

4. A self-locking fastener set forth in claim 3 wherein said inner wall of said skirt is inclined and forms an angle with said bearing surface no greater than about 45 degrees.

5. A self-locking fastener set forth in claim 4 wherein said inner end surface of said recesses are inclined with respect to said bearing plane by an angle of about 75 degrees.

6. A self-locking fastener set forth in claim 1 wherein said outer wall of said skirt is inclined and forms an angle with respect to said bearing plane of at least about 30 degrees.

7. A self-locking fastener set forth in claim 1 wherein said fastener is a flanged screw and said radially extending teeth are located substantially adjacent to the periphery of the flange.

* * * * *